United States Patent
Ikeda et al.

(10) Patent No.: US 7,418,363 B2
(45) Date of Patent: *Aug. 26, 2008

(54) MICROPATTERN MEASURING METHOD, MICROPATTERN MEASURING APPARATUS, AND COMPUTER-READABLE RECORDING MEDIUM ON WHICH A MICROPATTERN MEASURING PROGRAM IS RECORDED

(75) Inventors: Takahiro Ikeda, Kanagawa (JP); Yumiko Miyano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 489 days.

This patent is subject to a terminal disclaimer.

(21) Appl. No.: 11/180,609

(22) Filed: Jul. 14, 2005

(65) Prior Publication Data

US 2005/0278138 A1 Dec. 15, 2005

Related U.S. Application Data

(63) Continuation of application No. 10/685,392, filed on Oct. 16, 2003, now Pat. No. 6,963,819.

(30) Foreign Application Priority Data

Oct. 21, 2002 (JP) .............................. 2002-305460

(51) Int. Cl.
*G01B 5/02* (2006.01)
*G01B 5/14* (2006.01)
*G01B 7/02* (2006.01)
*G01B 7/14* (2006.01)
*G01B 11/02* (2006.01)
*G01B 11/14* (2006.01)
*G01B 13/02* (2006.01)
*G01B 21/02* (2006.01)

(52) U.S. Cl. ...................................... 702/152; 702/158
(58) Field of Classification Search .................. 702/94, 702/95, 150–153, 155, 157, 158
See application file for complete search history.

(56) References Cited

U.S. PATENT DOCUMENTS 5,027,417 A 6/1991 Kitakado et al.

(Continued)

FOREIGN PATENT DOCUMENTS

JP 7-027548 1/1995

(Continued)

OTHER PUBLICATIONS

Notification of Reason for Rejection issued by the Japanese Patent Office mailed Apr. 28, 2006, for Japanese Patent Application No. 2002-305460, and English-language translation thereof.

*Primary Examiner*—Michael P Nghiem
(74) *Attorney, Agent, or Firm*—Finnegan, Henderson, Farabow, Garrett & Dunner, L.L.P.

(57) ABSTRACT

A micropattern measuring method disclosed herein includes acquiring an image of a micropattern including plural layers; extracting a rough outline of the micropattern in the image as a sequence of points including plural points; dividing the plural points composing the sequence of points into groups; making each of the groups as each of patterns belong to any of the plural layers; and acquiring edge coordinates of a pattern to be measured from the patterns which are made to belong to the respective layers.

8 Claims, 20 Drawing Sheets

U.S. PATENT DOCUMENTS

| | | |
|---|---|---|
| 6,480,807 B1 | 11/2002 | Miyano |
| 6,772,089 B2 | 8/2004 | Ikeda et al. |
| 6,839,470 B2 | 1/2005 | Ikeda |
| 6,963,819 B2 * | 11/2005 | Ikeda et al. .................. 702/152 |
| 7,328,125 B2 * | 2/2008 | Kawai et al. ................. 702/155 |
| 2002/0141647 A1 | 10/2002 | Mitsui |
| 2003/0059104 A1 | 3/2003 | Mitsui |

FOREIGN PATENT DOCUMENTS

| | | |
|---|---|---|
| JP | 2001-091231 | 4/2001 |
| JP | 2001-110862 | 4/2001 |
| JP | 2002-148227 | 5/2002 |
| JP | 2002-296761 | 10/2002 |

* cited by examiner

| CONNECTIVITY PATTERN | COMBINATION OF PATTERNS | CONNECTIVITY PATTERN | COMBINATION OF PATTERNS |
|---|---|---|---|
| ① 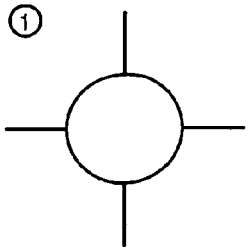 | UPPER LAYER : DOT, HOLE<br><br>LOWER LAYER : LINE, SPACE | ⑤ 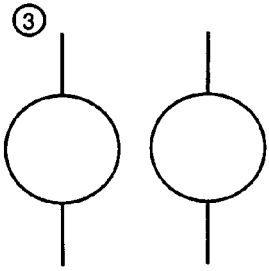 | UPPER LAYER : HOLE PATTERN<br><br>LOWER LAYER : HOLE, DOT, LINE, SPACE |
| ② 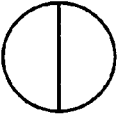 | UPPER LAYER: SPACE<br>UPPER LAYER : HOLE, DOT<br>OR<br>UPPER LAYER : HOLE, DOT<br>LOWER LAYER : LINE, SPACE | ⑥  | UPPER LAYER : HOLE PATTERN<br><br>LOWER LAYER : HOLE, DOT, LINE, SPACE |
| ③ 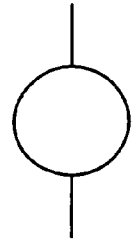 | UPPER LAYER: SPACE<br>UPPER LAYER : HOLE, DOT<br>OR<br>UPPER LAYER : HOLE, DOT<br>LOWER LAYER : LINE, SPACE | ⑦ 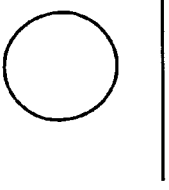 | UPPER LAYER : HOLE PATTERN<br><br>LOWER LAYER : HOLE, DOT |
| ④ 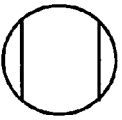 | UPPER LAYER: SPACE<br>UPPER LAYER : HOLE, DOT<br>OR<br>UPPER LAYER : HOLE, DOT<br>LOWER LAYER : LINE, SPACE | | |

FIG. 18

SEQUENCE OF PEAK POINTS

M1　　　M2

US 7,418,363 B2

MICROPATTERN MEASURING METHOD, MICROPATTERN MEASURING APPARATUS, AND COMPUTER-READABLE RECORDING MEDIUM ON WHICH A MICROPATTERN MEASURING PROGRAM IS RECORDED

CROSS REFERENCE TO RELATED APPLICATION

This is a continuation of application Ser. No. 10/685,392, filed Oct. 16, 2003, now U.S. Pat. No. 6,963,819, which is incorporated herein by reference.

BACKGROUND OF THE INVENTION

1. Field of the Invention

The present invention relates to a micropattern measuring method, a micropattern measuring apparatus, and a computer-readable recording medium on which a micropattern measuring program is recorded, in a semiconductor device manufacturing technique.

2. Related Background Art

Generally, a semiconductor device includes plural layers. When a micropattern on the semiconductor device is evaluated using a SEM (Scanning Electron Microscope), for example, in a contact hole pattern or the like after etching, a wiring pattern or the like on a layer thereunder is sometimes seen in an opening thereof.

FIG. 32 and FIG. 33 are diagrams showing examples of a micropattern in a contact hole examined under the SEM. In the case of examination under the SEM, there are various cases where only an edge on one side of a wiring pattern 20 is seen in an opening of a contact hole 10 as shown in FIG. 32, where edges on both sides of the wiring pattern 20 are seen as shown in FIG. 33, and so on due to variations in the wiring size of a lower layer, misalignment, or the like. Moreover, a position or positions where an edge or edges are seen are not fixed.

A common method of measuring the shape of a contact hole is, for example, a method of setting an ROI (region of interest), which is a region to be measured, to cross a central portion of a pattern of a contact hole 30 as shown in FIG. 34, searching for an edge position horizontally outward from a central portion of the ROI, calculating a distance from an edge paired with the extracted edge position, and calculating the maximum width thereof.

In Japanese Patent Laid-open No. Hei 7-27548 (hereinafter referred to as Patent Document 1), a method of designating a center of a contact hole pattern, converting an image to polar coordinates based on the center, and calculating an edge is proposed. In Japanese Patent Laid-open No. 2001-91231 (hereinafter referred to as Patent Document 2), a method of setting a closed region defined by double closed curves along a pattern of a contact hole and searching for an edge of the contact hole in the closed region is proposed.

However, in either method, when the edge of the lower-layer pattern is seen in the opening of the contact hole as shown in FIG. 32 to FIG. 34, the edge of a lower wiring pattern can be within an edge search region. In such a case, the edge of the lower wiring pattern which is situated further inside is extracted, whereby the contact hole cannot be measured accurately.

SUMMARY OF THE INVENTION

In order to accomplish the aforementioned and other objects, according to one aspect of the present invention, a micropattern measuring method, comprises:

acquiring an image of a micropattern including plural layers;

extracting a rough outline of the micropattern in the image as a sequence of points including plural points;

dividing the plural points composing the sequence of points into groups;

making each of the groups as each of patterns belong to any of the plural layers; and acquiring edge coordinates of a pattern to be measured from the patterns which are made to belong to the respective layers.

According to another aspect of the present invention, a micropattern measuring apparatus, comprises:

an image acquisition which acquires an image of a micropattern including plural layers;

a sequence-of-points extractor which extracts a rough outline of the micropattern in the image as a sequence of points including plural points;

a group divider which divides the plural points composing the sequence of points into groups;

a belonging section which makes each of the groups as each of patterns belong to any of the plural layers; and an edge acquisition which acquires edge coordinates of a pattern to be measured from the patterns which are made to belong to the respective layers.

According to another aspect of the present invention, a micropattern measuring program is recorded on a computer-readable recording medium, and the micropattern measuring program comprises:

computer readable program code which acquires an image of a micropattern including plural layers;

computer readable program code which extracts a rough outline of the micropattern in the image as a sequence of points including plural points;

computer readable program code which divides the plural points composing the sequence of points into groups;

computer readable program code which makes each of the groups as each of patterns belong to any of the plural layers; and computer readable program code which acquires edge coordinates of a pattern to be measured from the patterns which are made to belong to the respective layers.

BRIEF DESCRIPTION OF THE DRAWINGS

FIG. 18 is a diagram showing an example of an association table in which each combination of patterns and the connectivity of a sequence or sequences of points constituting a rough outline are associated with each other;

DESCRIPTION OF THE PREFERRED EMBODIMENTS

First Embodiment

In the first embodiment, by extracting plural peak positions of patterns from a SEM image of a semiconductor device which is composed of plural layers, dividing data on the extracted peak positions into groups, and associating each group with a pattern on each layer, the shape of the pattern on each layer can be measured accurately. Further details will be given below.

Figure 1:
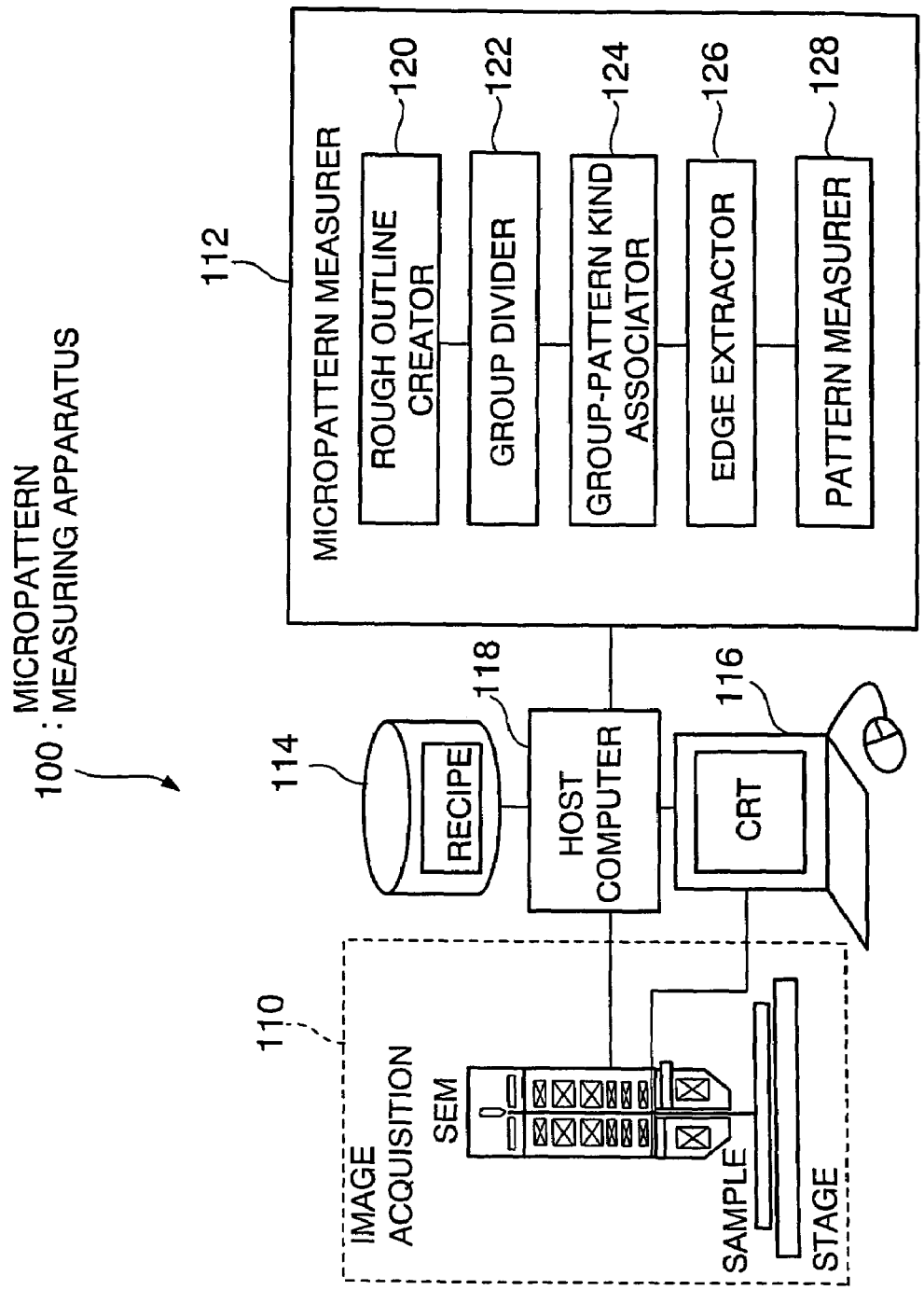
FIG. 1 is a diagram showing an example of the configuration of a micropattern measuring apparatus according to an embodiment.

FIG. 1 is a block diagram showing the configuration of a micropattern measuring apparatus 100 used in this embodiment. As shown in FIG. 1, the micropattern measuring apparatus 100 according to this embodiment includes an image acquisition 110 which acquires an image of a micropattern, a micropattern measurer 112 which measures the micropattern, a storage 114 which stores conditions for measurement, a recipe in which processes are set, and the like, a CRT 116 which displays the image of the micropattern, and a host computer 118 which controls the above components.

A SEM is given as an example of the image acquisition 110. The micropattern measurer 112 includes a rough outline creator 120 which creates a rough figure of an outline of the micropattern with a sequence of points composed of plural peak points, a group divider 122 which divides the sequence of points composing the rough outline into groups, a group-pattern kind associator 124 which associates the groups resulting from division with pattern kinds, an edge extractor 126 which sets an edge search direction and an edge search region (ROI) based on the associated information to perform edge extraction, and a pattern measurer 128 which measures the shape of a target pattern with respect to the obtained sequence of points of the edge.

Figure 2:
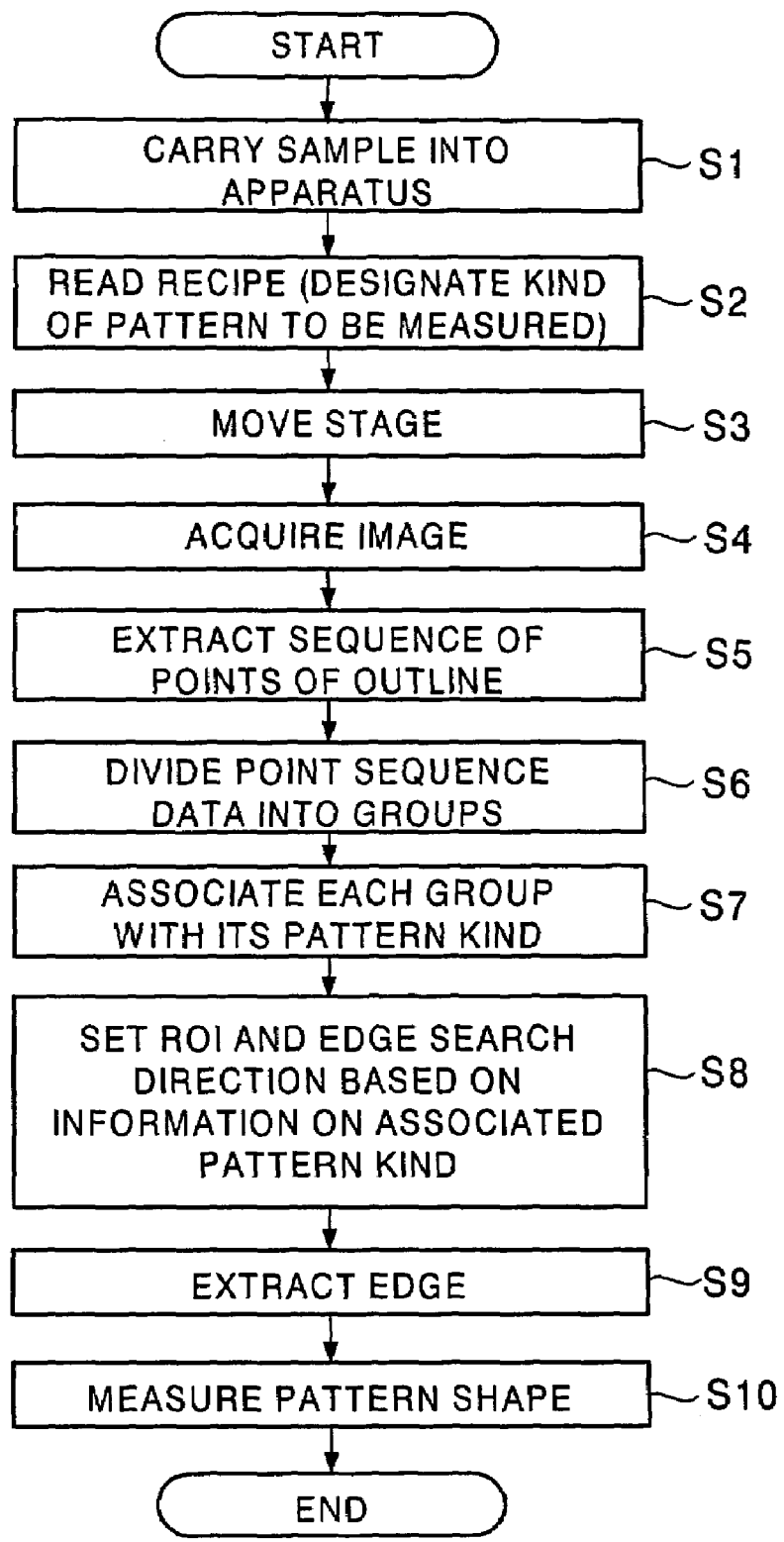
FIG. 2 is a flowchart explaining the contents of a micropattern measuring process according to a first embodiment.

Next, a brief explanation of steps of a pattern evaluating method in this embodiment will be given based on FIG. 2. As shown in FIG. 2, first, a sample on which a micropattern to be measured is formed is carried into the apparatus and placed on a stage (step S1).

Then, a recipe in which the contents of measurement are stored is read from the storage 114, and the recipe is set (step S2). In the recipe, the position of the pattern to be measured, the name of a template file used for pattern matching so that the target pattern will be situated within the field of view, the kind of the target pattern, and the like are recorded. For example, a line pattern, a space pattern, a hole pattern, and an island pattern are given as examples of the kind of the pattern.

Figure 3:
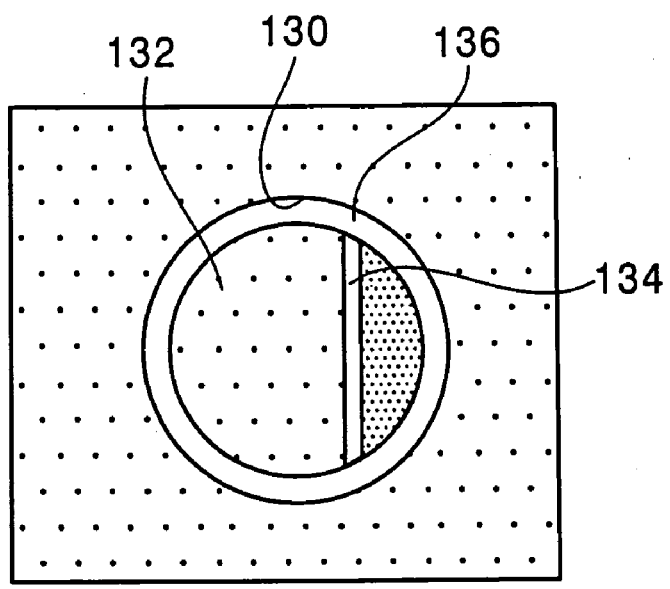
FIG. 3 is a diagram showing an example of an acquired image when a hole pattern is on an upper layer and a line pattern is on a lower layer.

Then, in accordance with the read recipe, the stage is moved, an electron beam is scanned over the sample, pattern matching is performed to thereby acquire an image containing the target pattern (step S3, step S4). Consequently, an image in which an edge 134 being part of a line pattern 132 in a layer under a hole pattern 130 is seen in the hole pattern 130, for example, such as shown in FIG. 3 can be obtained.

Figure 4:
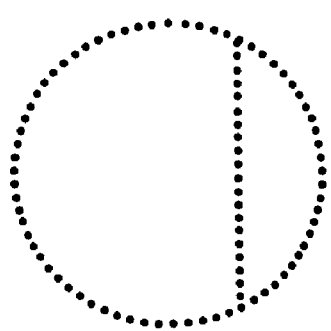
FIG. 4 is an example showing an example of a sequence of peak points acquired from FIG. 3.

Thereafter, by a process described in detail later, all peak points which appear to be an edge of the hole pattern 130 and the edge of the line pattern 132 are extracted (step S5). FIG. 4 shows an example of an obtained sequence of peak points. In FIG. 4, each peak point shows a position judged as the edge.

Figure 5:
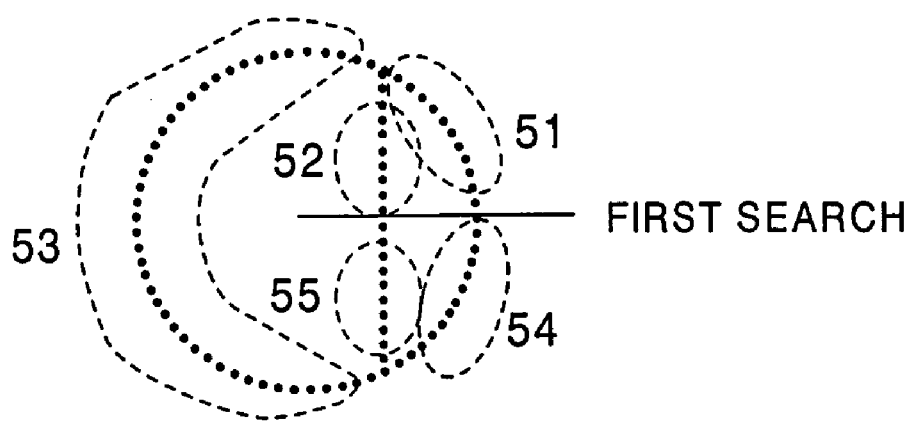
FIG. 5 is a diagram showing an example in which the peak points in FIG. 4 are divided into groups.

Then, the obtained sequence of peak points is divided into groups by a process described in detail later (step S6). For example, as shown in FIG. 5, the sequence of peak points in FIG. 4 is divided into five groups, a group 51 to a group 55, then the groups 52 and 55 are connected to constitute one group 56, and the groups 51, 53, and 54 are connected to constitute one group 57.

Figure 6:
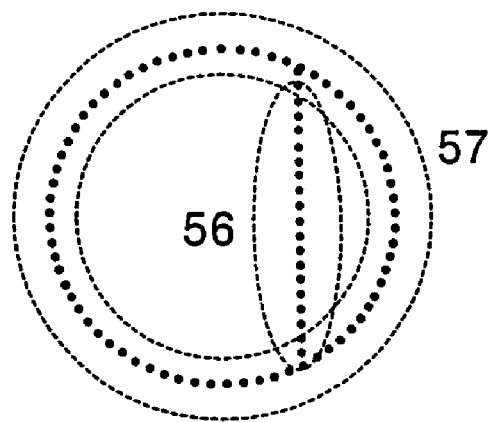
FIG. 6 is a diagram showing a state in which the groups in FIG. 5 are connected according to connectivity between the groups.

Subsequently, by a process described in detail later, it is judged which pattern each group belongs to, and thereby each group is made to belong to its pattern kind (step S7). For example, as shown in FIG. 6, the groups 56 and 57 in FIG. 5 are made to belong to a line pattern and a hole pattern, respectively.

Thereafter, as a result of belonging and in accordance with the contents of measurement set in the recipe, an ROI and an edge search direction are set so as to extract the edge of the target pattern (step S8), the edge is extracted (step S9), and the shape of the obtained sequence of points of the edge is measured in accordance with the contents of measurement set in the recipe (step S10).

Hereinafter, an detailed explanation of the contents of this embodiment containing a detailed explanation of each step will be given.

First, the sample is carried into the apparatus, and the recipe which stores the contents of measurement is read (step S1, step S2). In this embodiment, it is assumed that a recipe for measuring a contact hole is read. Thereafter, the stage is moved, and the electron beam is scanned over the target pattern, thereby obtaining such an image as shown in FIG. 3 (step S3, step S4). As shown in FIG. 3, in a screen, the hole pattern 130, and part of the line pattern 132 inside the hole pattern 130 are seen. As a characteristic of a SEM image, a portion corresponding to an edge 136 of the hole pattern 130 and a portion corresponding to an edge 134 on the right side of the line pattern 132 shine brighter and more whitely than the other portions. In a related measuring method, the hole pattern 130 cannot be measured accurately due to the portion corresponding to the edge 134 of the line pattern 132.

Hence, in this embodiment, an outline of the hole pattern 130 and a rough outline of the line pattern 132 seen in this image are extracted in the following manner (step S5).

Figure 7:
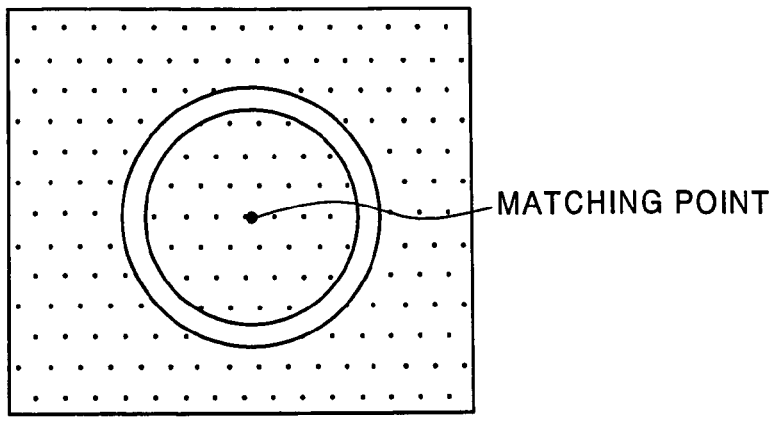
FIG. 7 is a diagram showing a matching point which is a central position (representative point) in respective search directions.

First, pattern matching is performed for the image which is being examined with a template such as shown in FIG. 7. On this occasion, the center of the contact hole is used as a matching point. This matching point is a representative point in this embodiment.

Figure 8:
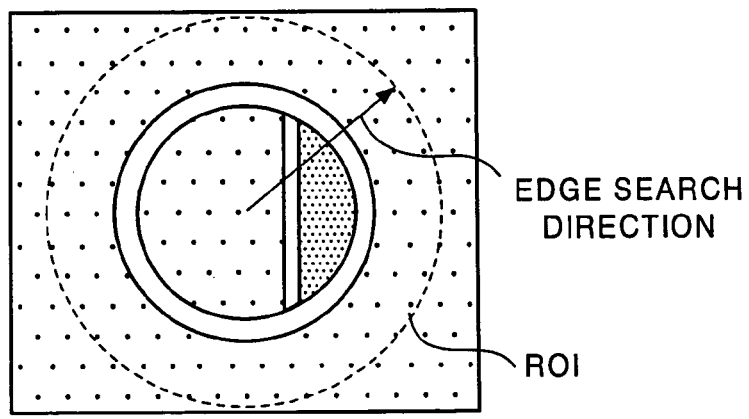
FIG. 8 is a diagram showing a search direction with the matching point as the center.
Figure 9:
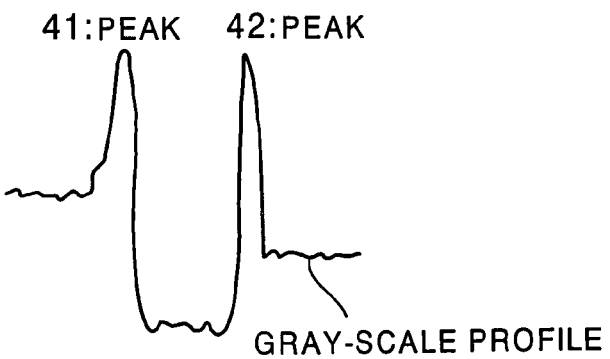
FIG. 9 is a diagram showing an example of a gray-scale profile obtained as a result of edge search.

Then, as shown in FIG. 8, a search for the edge is performed radially with the matching point as the center. In this case, an edge search region (ROI) is from the matching point to the outside of the contact hole. Subsequently, a gray-scale profile is acquired within the set edge search region. Thus, a gray-scale profile such as shown in FIG. 9 is obtained. From this gray-scale profile, all peak positions in one edge search direction are detected as peak points. For example, the Savitzky-Golay method for smoothing and differentiation is used for detecting peak points. Generally, the SEM image has a lot of noise, and hence many small peaks exist in the gray-scale profile. But, by setting a threshold value in relation to a peak value, these small peaks can be eliminated.

In this manner, for example, in FIG. 9, a peak position 41 and a peak position 42 are detected as peak points. This process is performed through 360 degrees, that is, in all edge search directions. Moreover, at this time, the acquired gray-scale profile is temporarily stored in a memory of the host computer 118.

Figure 10:
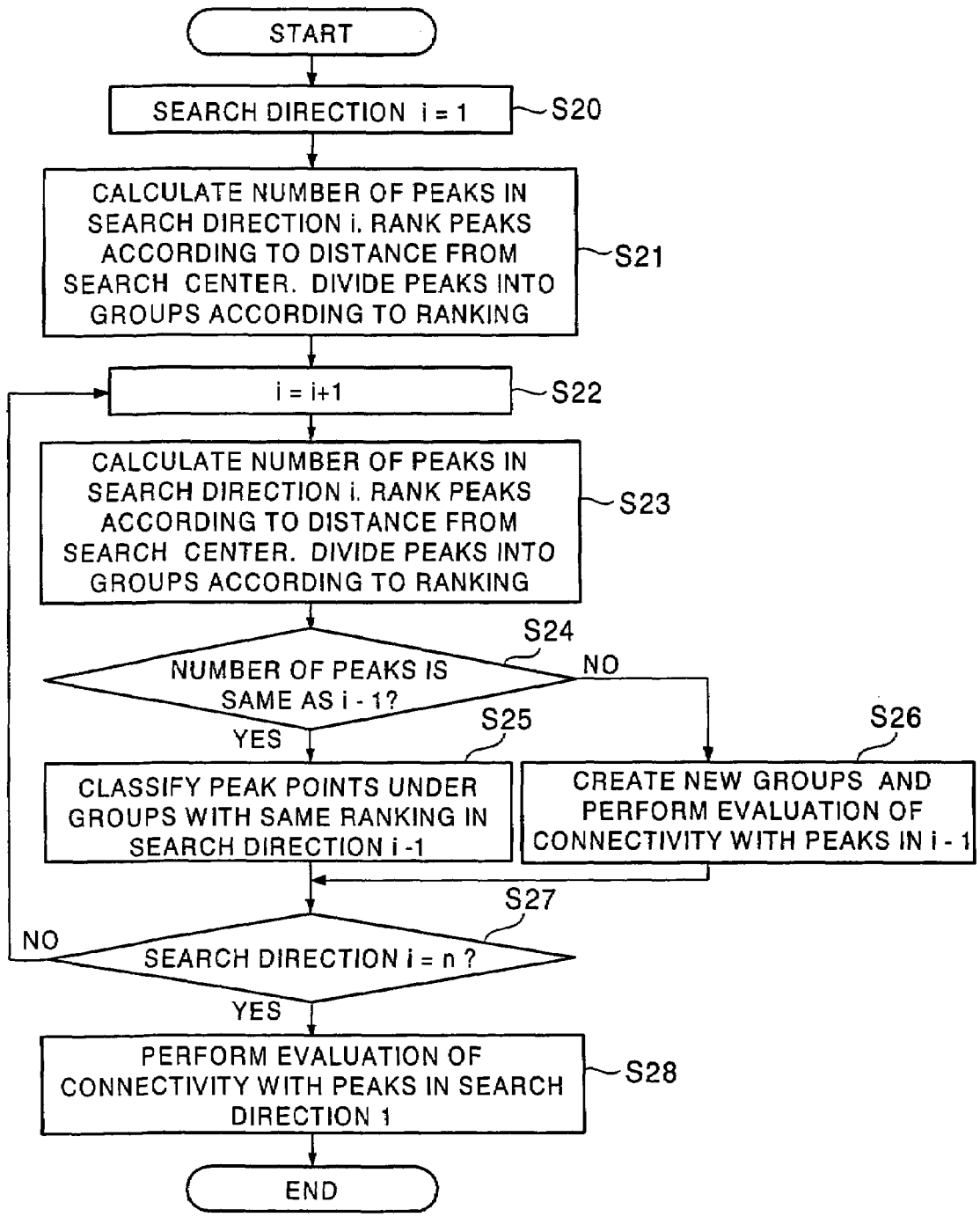
FIG. 10 is a flowchart explaining the contents of a grouping process according to the first embodiment.

In this embodiment, a sequence of peak points composed of the peak points detected by this edge search is divided into groups according to the distance from a center of the edge search and the number of peaks. FIG. 10 is a flowchart explaining the contents of this grouping process.

Namely, the initial value of an edge search direction i is set to 1 (step S20). When, in some edge search direction i, plural peak positions are extracted and thereby plural peak points are detected, the peak points are ranked according to the distance from the search center to each peak and divided into groups according to ranking (step S21). For example, peak points are ranked in first, second, . . . place in order of proximity to the search center. Then, one is added to a variable i, and the process proceeds to the next search direction (step S22).

In this search direction i, as in step S21, the number of peaks in the search direction i is calculated, and when plural peaks are extracted, the peaks are ranked according to the distance from the search center to each peak and divided into groups according to ranking (step S23). In other words, a peak point in a position far from the search center has a larger value than a peak point in a position close thereto.

Subsequently, it is judged whether the number of the peak points extracted in this search direction i is the same as that in the previous search direction i−1 (step S24). When the numbers of peak points in the search direction i and the search direction i−1 are the same (step S24: Yes), the peak points are classified under the groups with the same ranking in the search direction i−1 (step S25).

On the other hand, when the numbers of peak points in the search direction i and the search direction i−1 are different (step S24: No), the peak points in the search direction i are divided into groups separately from the search direction i−1. At the same time, connectivity between data is evaluated (step S26). Namely, distances between all the peak points in the search direction i−1 and all the peak points in the search direction i are measured, and if the distance between peak points exceeds a preset threshold value, it is judged that groups containing these peak points do not connect with each other. Contrary to this, if the distance is the preset threshold value or less, it is judged that the groups containing these peak points connect with each other.

Then, it is judged whether peak position detection has been performed in all search directions (step S27). More specifically, it is judged whether the variable i has become equal to a search total number n. For example, when 360 degrees is divided into 360 equal parts, the search total number n is 361, and the variable i changes from 1 to 360. When the variable i and the search total number n are not equal (step S27: No), the aforementioned process from step S22 is repeated.

On the other hand, when the variable i and the search total number n are equal (step S27: Yes), this means that the aforementioned peak extraction, grouping, and evaluation of connectivity between groups have been performed in all of the search directions. Hence,the evaluation of connectivity between a sequence of peaks in a search direction n−1 and a sequence of peaks in a search direction 1 is performed (step S28).

Thus, it is possible to extract such a sequence of peak points as shown in FIG. 4 and divide this sequence of peak points into the groups 51 to 55 as shown in FIG. 5. Hence, it turns out that the respective groups 51 to 55 are connected as shown in FIG. 11.

Figure 11:
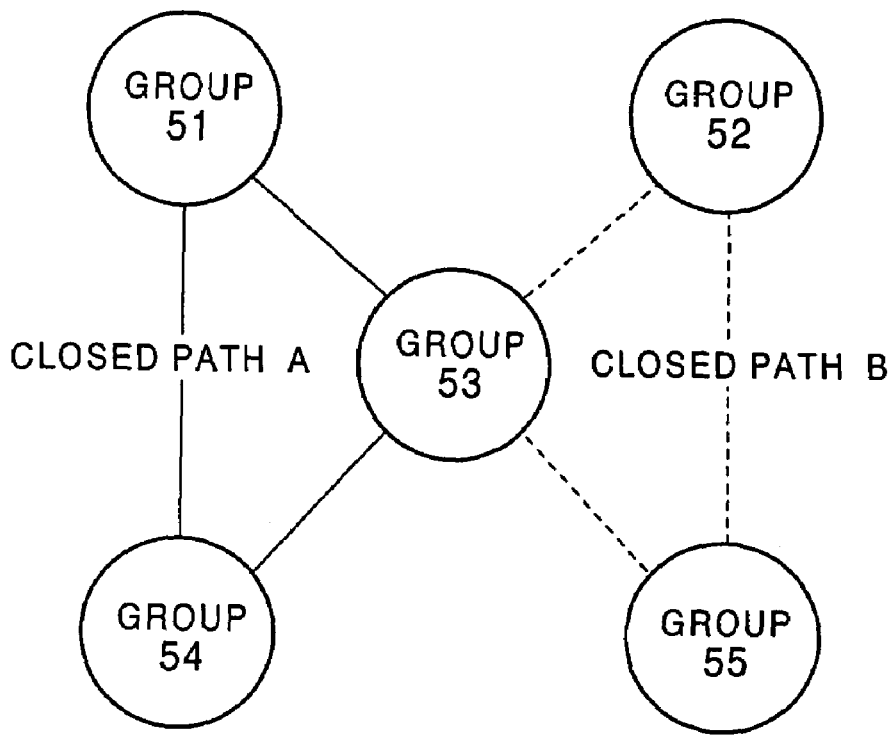
FIG. 11 is a diagram showing an example of closed paths (closed paths A and B) extracted from FIG. 5.

As can be seen from FIG. 11, each of the five groups 51 to 55 is connected to another group on either side to thereby form closed paths. There are two possible closed paths, 51-53-54-51 (a closed path A, a full line in FIG. 11) and 52-53-55-53 (a closed path B, a dotted line in FIG. 11), and either one of them should be a target contact hole pattern. These two closed paths are associated with pattern kinds in the following manner (step S7).

Namely, rankings given to the respective groups composing the respective closed paths based on the distance from the search center are examined, and a mean value thereof is calculated. Here, it is assumed that the mean value of rankings is 1.67 in the case of the closed path A, and 1 in the case of the closed path B. Accordingly, when the two closed paths A and B are compared, the closed path A is situated outside the closed path B. This is because the ranking of peak points on the outside has a larger value than the ranking of peak points on the inside. Moreover, in many cases of measurement of the hole pattern, even if a base is seen from the hole pattern, the base is situated inside the hole pattern on the uppermost layer in many cases, whereby the edge of hole pattern is furthest outside. Therefore, a sequence of points of the closed path A which is situated further outside is based on the hole pattern.

Alternatively, it is also possible to compare the two sequences of peak points composing the closed paths A and B regarding which one has a more perfect circular shape by using a Fourier descriptor or the like and extract a sequence of peak points based on the contact hole pattern.

For example, a Z-type Fourier descriptor proposed by Zahan and Roskies is used. A Bending Function (total curvature function: the cumulative sum of angular changes from one point on a closed curve) is calculated with respect to each closed path and Fourier expanded, and amplitudes at respective orders in this case are compared.

Figure 12:
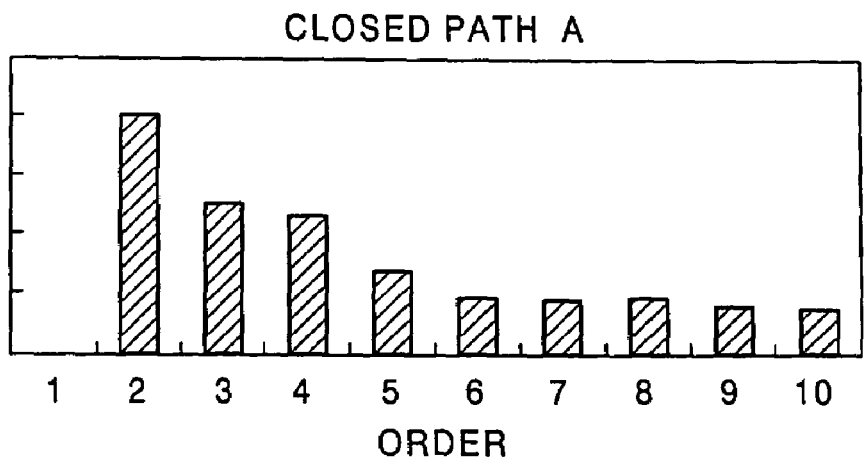
FIG. 12 is a diagram showing an amplitude of a Fourier descriptor of the closed path A in FIG. 5 in graphical form.
Figure 13:
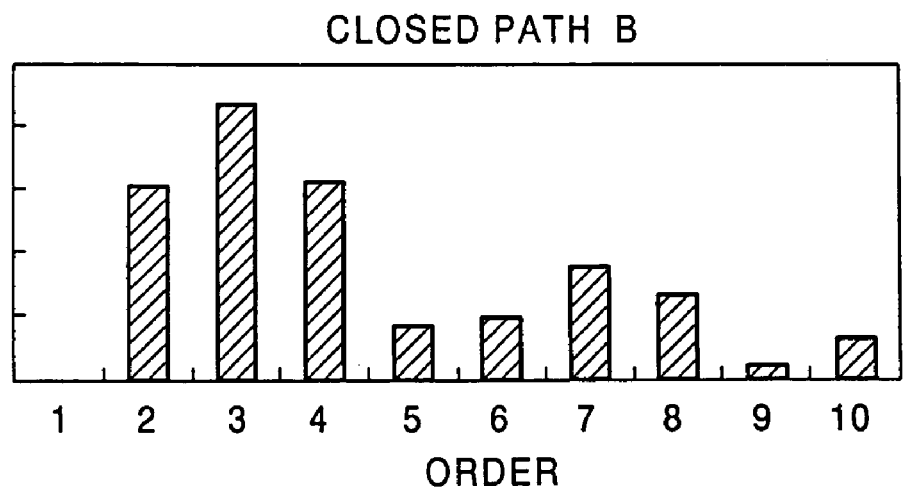
FIG. 13 is a diagram showing an amplitude of a Fourier descriptor of the closed path B in FIG. 5 in graphical form.

FIG. 12 and FIG. 13 are graphs in which amplitudes of Fourier descriptors of the closed paths A and B are calculated based on respective orders. In the closed path B, the amplitude in the third order term is the largest. If the pattern has a shape close to a circle, it is improbable that the amplitude in an odd-numbered term such as the third order term is prominently large. Accordingly, it can be said that the closed path A is a sequence of peak points based on the target contact hole pattern. Incidentally, a P-type Fourier descriptor is also available.

It has turned out that the sequence of peak points constituting the closed path A is a sequence of points based on the peak points of the target hole pattern, and hence the edge of the hole pattern is extracted by the following process (step S8, step S9). Namely, the edge is extracted by applying an edge extraction algorithm (for example, a threshold method) preset in the recipe on the basis of a peak contained in the closed path A to the gray-scale profile which is temporarily stored in the memory. For example, when the threshold method and the algorithm are preset and the peak 42 is based on the target pattern in the gray-scale profile shown in FIG. 9, a search for a base position is performed in a search center direction with the peak 42 as 100%, and an edge position which has the set threshold value is determined. The edge is extracted by performing this process for gray-scale profiles in all the search directions.

Figure 14:
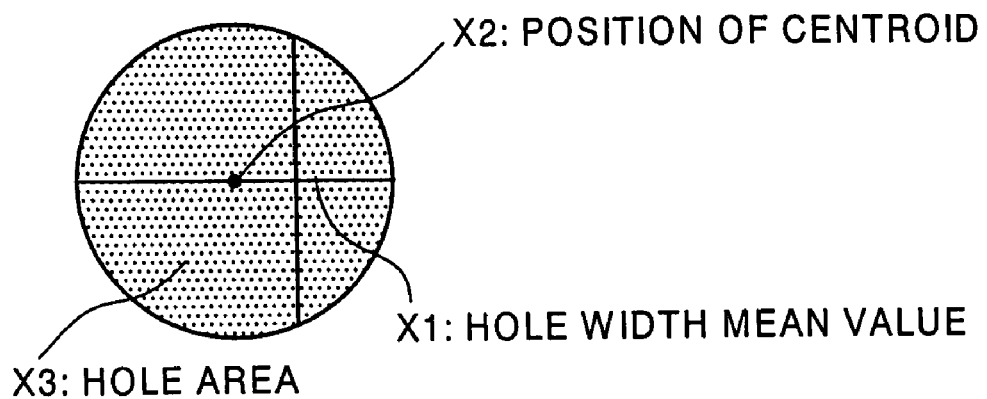
FIG. 14 is a diagram showing an example of measurement performed for a hole to be measured.

Thereafter, with respect to the thus-obtained edge, a hole width mean value X1, a hole centroid X2, a hole area X3, and so on are measured as shown in FIG. 14 (step S10).

As described above, according to the micropattern measuring apparatus 100 of this embodiment, even when patterns formed on different layers appear in one image, a target pattern can be measured stably and accurately. More specifically, by judging connectivity of a sequence of peak points obtained from the acquired image, a rough outline is determined, and it is judged which layer this rough outline belongs to based on a pattern registered in a recipe. Hence, each of the patterns which appear in the image can be made to belong to any of the layers.

Second Embodiment

The second embodiment is obtained by modifying the aforementioned first embodiment. An association table in which connectivity of a sequence or sequences of peak points and a combination of upper-layer and lower-layer patterns are associated with each other is previously prepared, and by checking the association table based on the connectivity of acquired sequence or sequences of peak points, it is judged which layer each pattern belongs to. Further details will be given below.

Figure 15:
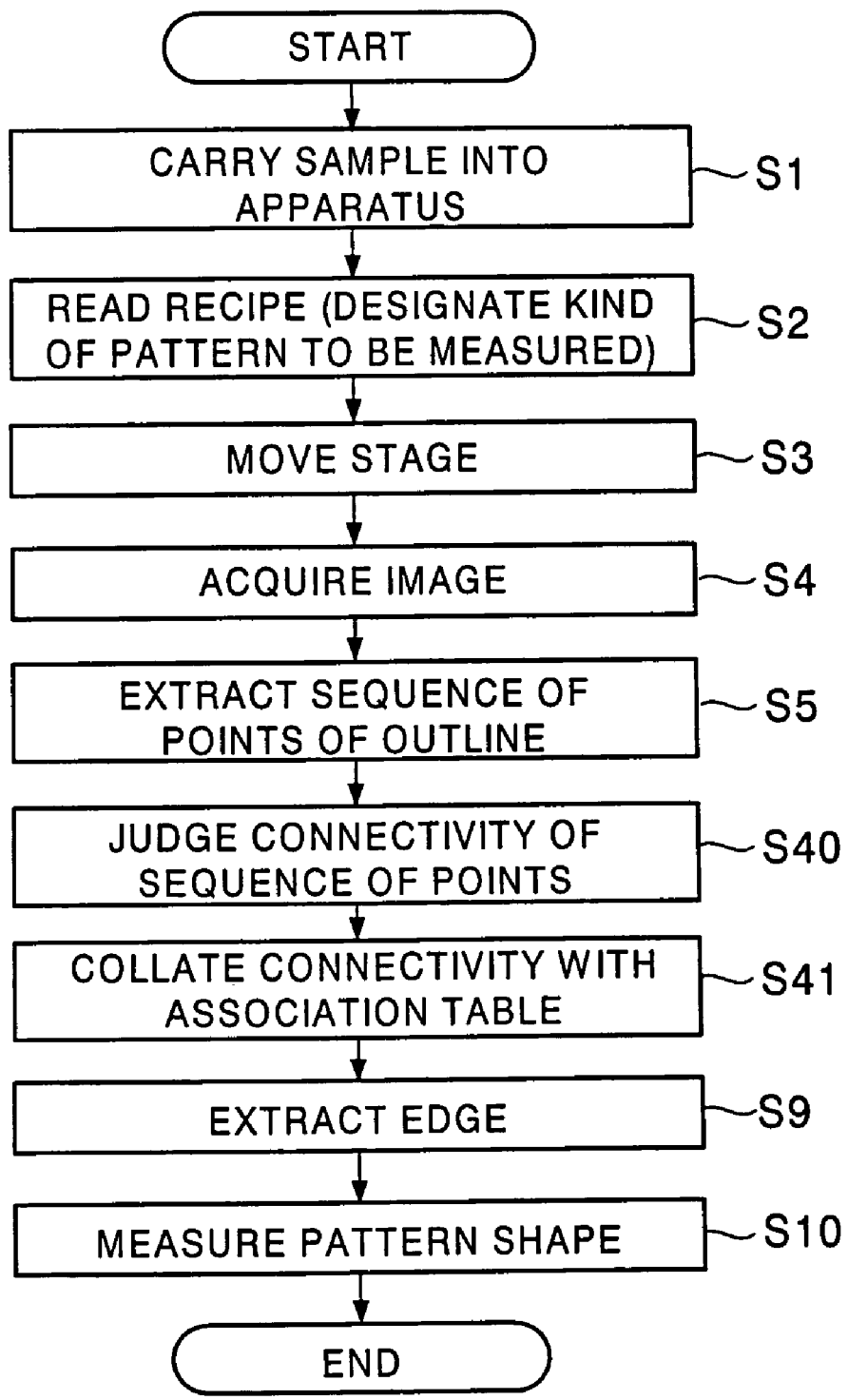
FIG. 15 is a flowchart explaining the contents of a micropattern measuring process according to a second embodiment.

Also in this embodiment, a micropattern is measured with the micropattern measuring apparatus 100 shown in FIG. 1. FIG. 15 shows a schematic flowchart of measurement according to this embodiment. FIG. 15 corresponds to FIG. 2 in the aforementioned first embodiment.

Figure 16:
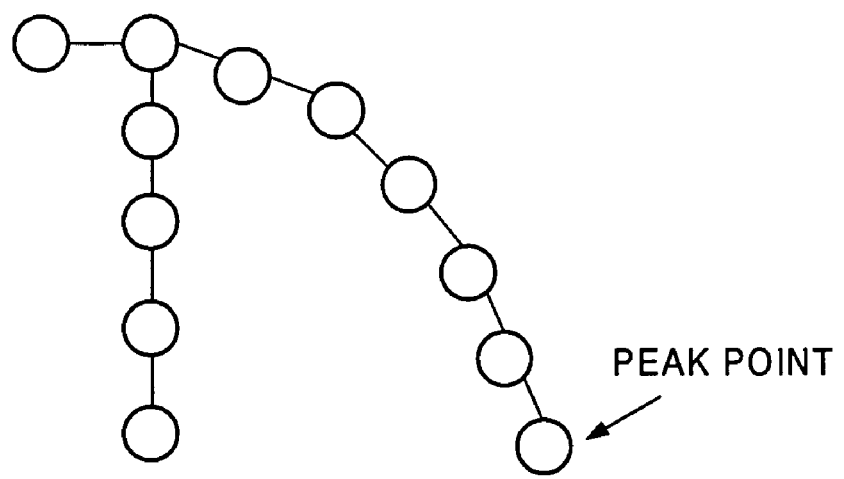
FIG. 16 is a diagram showing an ideal tree structure of a sequence of peak points.
Figure 17:
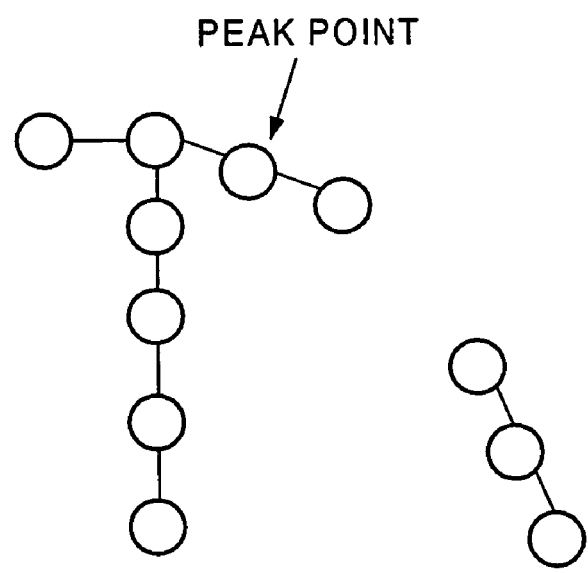
FIG. 17 is a diagram showing an actual tree structure of a sequence of peak points.

As shown in FIG. 15, a micropattern measuring process according to this embodiment is the same as that in the aforementioned first embodiment up to step S5, but the process thereafter is different. Namely, the connectivity of a sequence of peak points is evaluated by the following process. The connectivity of peak points obtained in some search direction i and a search direction i+1 is judged by the distance between the peak points, and when the distance is smaller than a preset threshold value, the peak point is judged to be connected to a sequence of points (step S40). A connection of peak points is represented by a tree structure. FIG. 16 and FIG. 17 are each an enlarged view of part of a tree structure of a connection of peak points.

FIG. 16 shows an ideal tree structure of a connection of peak points. However, in the actual SEM image, a dark portion sometimes exists in an edge portion owing to a pattern shape, noise, and so on, and as a result, peak points may be obtained intermittently as shown in FIG. 17 unlike being obtained continuously as shown in FIG. 16. In this case, upon completion of all searches, it is suitable to extract all sequences of peak points which are disconnected on one side, measure the distance between peak points, and connect the peak points if the distance is smaller than a preset second threshold value.

Here, when two layers which are a combination of any two of a line pattern, a space pattern, a hole pattern, and a dot pattern are simultaneously seen in one image, combinations such as shown below are mainly conceivable.

a line (or space) pattern inside a hole pattern
a hole (or dot) pattern inside a hole pattern
a hole (or dot) pattern inside a space pattern
a hole (or dot) pattern under a line pattern In each case, various variations exist, for example, according to the position of the edge of a pattern which is seen therein (or thereunder) and according to whether all (both sides in the case of the line or the space pattern) of the edge or only part (one side in the case of the line or the space pattern) of the edge is seen. Also, various variations exist according to the angle of the line (or space) pattern.

If, with respect to these various patterns, connections of peak points are tabulated by the aforementioned method, a table shown in FIG. 18 is obtained. This depends on only connectivity information without depending on either the angle or the size. The association relation between the connectivity of a sequence or sequences of points and a combination of patterns is previously stored as an association table in the apparatus. For example, in this embodiment, the association table in FIG. 18 is stored in the storage 114.

Then, the micropattern measuring apparatus 100 according to this embodiment collates the connectivity of peak points judged in step S40 with this association table and determines an upper-layer pattern and a lower-layer pattern (step S41).

Figure 19:
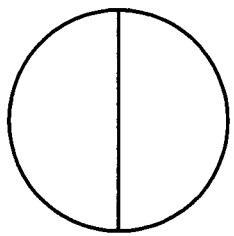
FIG. 19 is a diagram showing the connectivity of peak points obtained from images in FIG. 16 and FIG. 18.

For example, the connectivity of peak points obtained in FIG. 16 and FIG. 18 is as shown in FIG. 19. If this connectivity is collated with the association table in FIG. 18, it turns out that it is a pattern composed of a closed path and a branch which diverges from the closed path and is connected again to the closed path as shown by a pattern No. 5 in the table. Taking notice of a combination of the layer structure of this pattern, it is found that inside a hole pattern, part of a pattern (line, space, hole, or dot pattern) on a layer thereunder is seen. A closed path portion corresponds to the upper-layer hole pattern. Accordingly, on the basis of a sequence of peak points forming the close circuit, the edge is extracted (step S9) and the pattern is measured (step S10) in the same manner as in the aforementioned first embodiment.

As described above, also according to the micropattern measuring apparatus 100 of this embodiment, it is possible to measure a target pattern stably and accurately even when patterns formed on different layers appear in one image. More specifically, by judging the connectivity of a sequence or sequences of peak points obtained from the acquired image and collating this connectivity with an association table prepared in advance, it is judged which layer each pattern belongs to. Consequently, each of the patterns which appear in the image can be made to belong to any of the layers.

Third Embodiment

The third embodiment is obtained by modifying the aforementioned first embodiment. By performing Hough transformation for peak points extracted from an acquired image, a straight line contained in a sequence of the peak points is extracted, patterns except the straight line are extracted based on peak points other than peak points constituting the straight line, and based on a recipe, it is judged which layer each of the patterns belongs to. Further details will be given below.

Figure 20:
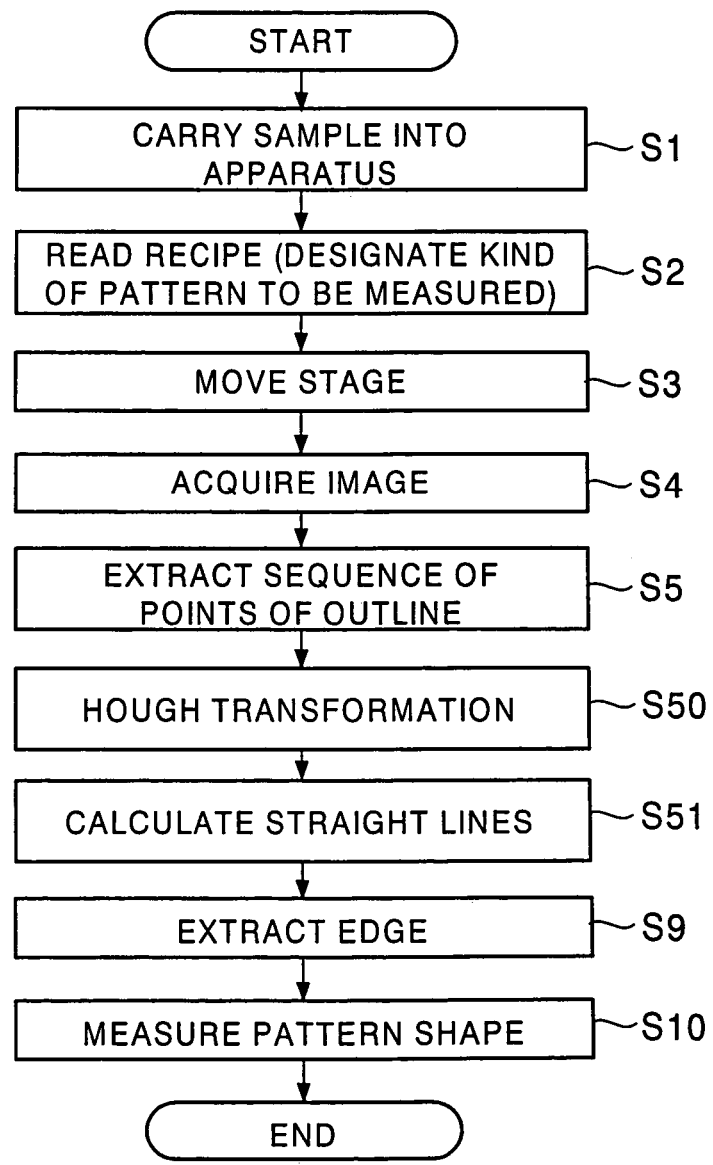
FIG. 20 is a flowchart explaining the contents of a micropattern measuring process according to a third embodiment.

Also in this embodiment, a micropattern is measured with the micropattern measuring apparatus 100 shown in FIG. 1. FIG. 20 shows a schematic flowchart of measurement according to this embodiment. FIG. 20 corresponds to FIG. 2 in the aforementioned first embodiment.

Figure 21:
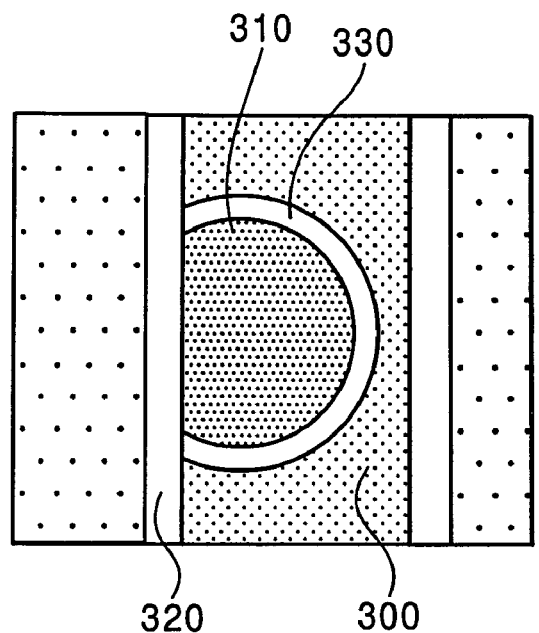
FIG. 21 is a diagram showing an example of an acquired image when a line pattern is on an upper layer and a hole pattern is on a lower layer.

As shown in FIG. 20, a micropattern measuring process according to this embodiment is the same as that in the aforementioned first embodiment up to step S5, but the process thereafter is different. Incidentally, in this embodiment, it is assumed that such a SEM image as shown in FIG. 21 can be acquired in step S4. Namely, as shown in FIG. 21, it is assumed that in the image, a space pattern 300 and part of a hole pattern 310 inside the space pattern 300 are seen. As described above, as a characteristic of the SEM image, a portion corresponding to an edge 320 of the space pattern 300 and a portion corresponding to an edge 330 of the hole pattern 310 shine brighter and more whitely than the other portions. In the related measuring method, the space pattern 300 cannot be successfully measured due to the portion corresponding to the edge 330 of the hole pattern 310 which is situated inside the space pattern 300.

Figure 22:
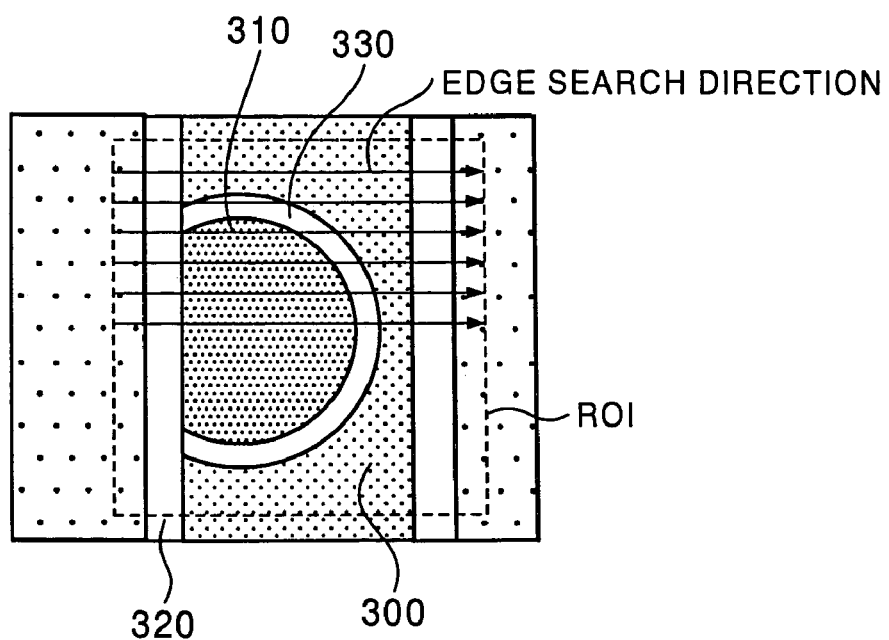
FIG. 22 is a diagram showing another example of an edge search direction.
Figure 23:
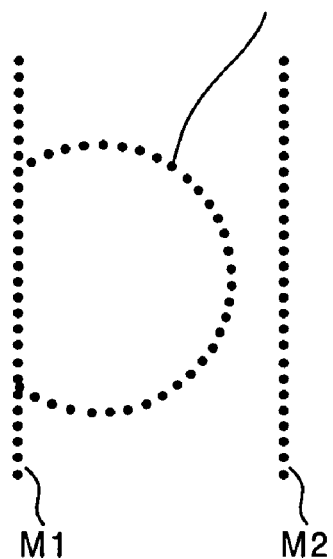
FIG. 23 is a diagram showing an example of sequences of peak points obtained from the image in FIG. 21.

Moreover, in step S5, peak points may be extracted in a radial direction with the hole pattern as the center as in the aforementioned first embodiment, or may be extracted in a direction perpendicular to the space pattern as shown in FIG. 22. In the case of the images in FIG. 21 and FIG. 22, obtained sequences of peak points are as shown in FIG. 23 in either method.

Then, the micropattern measuring apparatus 100 according to this embodiment performs Hough transformation for each peak point constituting the sequences of peak points (step S50). More specifically, in relation to coordinates (x, y) of each peak point, $\theta$ and $\rho$ are calculated by the following expression.

$$\rho = x \cdot \cos\theta + y \cdot \sin\theta \quad \ldots \quad (1)$$

Figure 24:
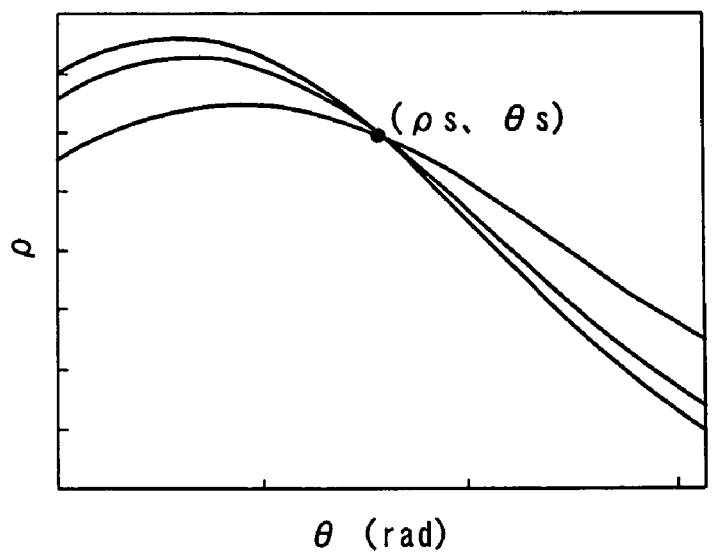
FIG. 24 is a diagram explaining a state in which curves obtained by performing Hough transformation for plural points constituting a straight line in an xy plane intersect at one point in a $\rho\theta$ plane.

For example, if Hough transformation is performed for some point (x, y) on an xy plane, a curve such as shown in FIG. 24 is obtained. Moreover, when plural points on the xy plane form a straight line, results obtained by the Hough transformation of the points intersect at one point ($\rho s$, $\theta s$) on a $\rho\theta$ plane as shown in FIG. 24. Therefore, when ($\rho s$, $\theta s$) is substituted in the above expression (1), an expression of the straight line is obtained.

Figure 25:
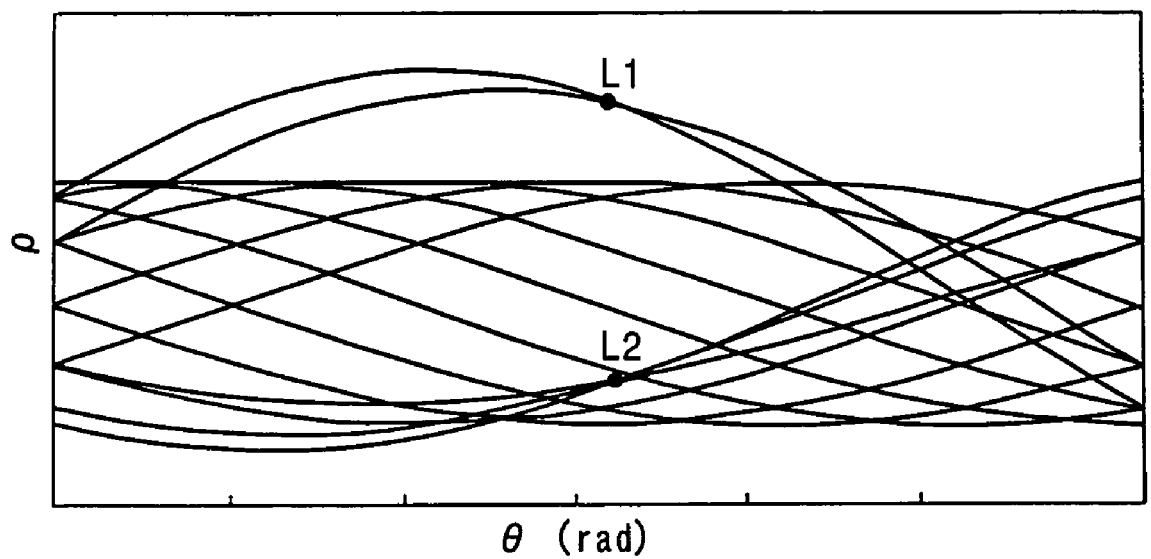
FIG. 25 is a diagram showing curves in the $\rho\theta$ plane when Hough transformation is performed for each peak point of the sequences of peak points in FIG. 23.

For example, if Hough transformation is performed for each peak point of the sequences of peak points shown in FIG. 23, curves such as shown in FIG. 25 are obtained. As shown in FIG. 25, the respective curves intersect at points L1 and L2. Accordingly, straight lines M1 and M2 are calculated from $\rho$ and $\theta$ of these points.

Thereafter, the micropattern measuring apparatus 100 selects a peak point near the straight lines M1 and M2 from peak points other than the peak points constituting the calculated straight lines M1 and M2, and extracts the edge on the basis of the selected peak point as in the first embodiment (step S9). Subsequently, the space width or the like is measured based on the obtained edge position (step S10).

It should be mentioned that this embodiment can be applied to patterns other than a straight line such as used in the first embodiment. However, in this case, it is necessary to select a peak point which is not located near the extracted straight line and perform edge extraction.

As described above, also according to the micropattern measuring apparatus 100 of this embodiment, it is possible to measure a target pattern stably and accurately even when patterns formed on different layers appear in one image. More specifically, Hough transformation is performed for peak points obtained from an acquired image, and thereby a straight line is extracted. A pattern of peak points other than peak points constituting the extracted straight line is acquired, and it is judged which layers these straight line and pattern belong to. Consequently, each of the patterns which appears in the image can be made to belong to any of the layers.

Fourth Embodiment

Figure 26:
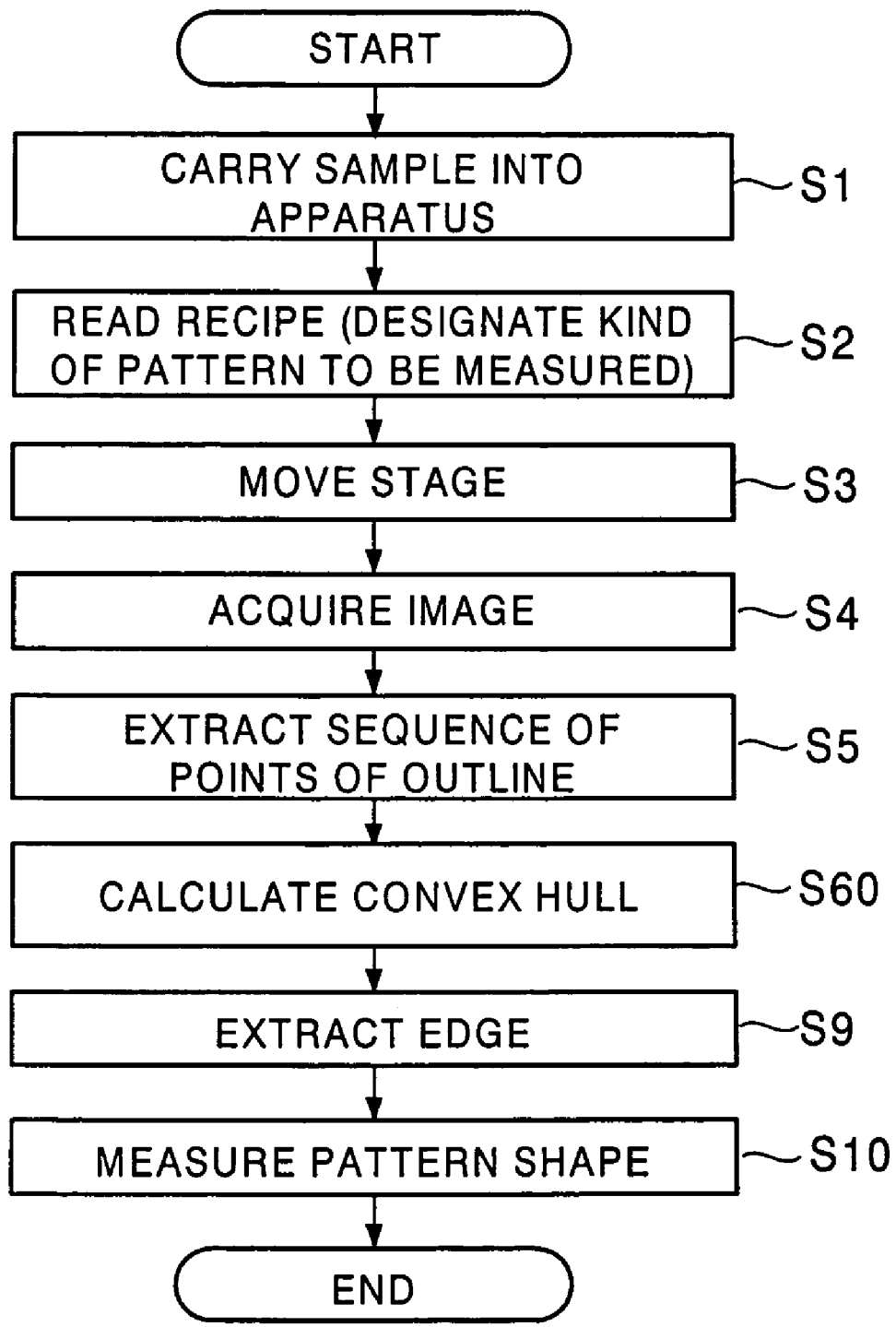
FIG. 26 is a flowchart explaining the contents of a micropattern measuring process according to a fourth embodiment.

Also in this embodiment, a micropattern is measured with the micropattern measuring apparatus 100 shown in FIG. 1. FIG. 26 shows a schematic flowchart of measurement according to this embodiment. FIG. 26 corresponds to FIG. 2 in the aforementioned first embodiment.

Figure 27:
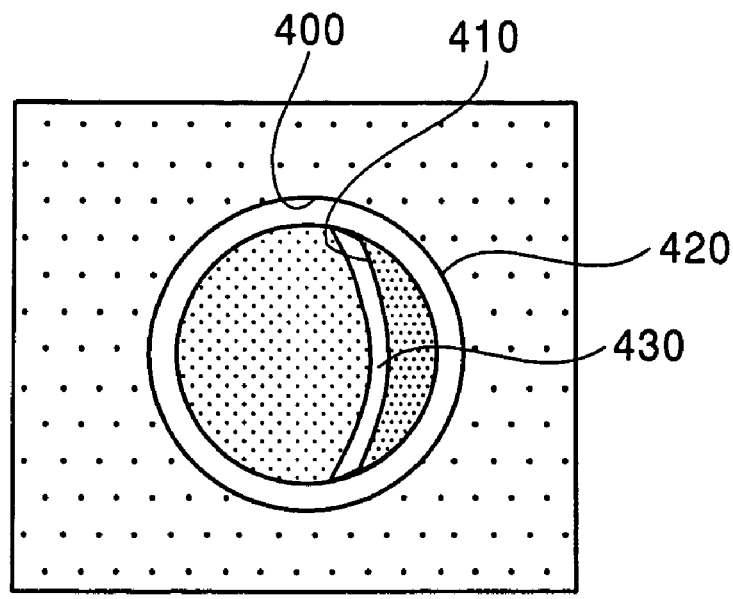
FIG. 27 is a diagram showing an example of an acquired image when hole patterns are on both an upper layer and a lower layer.

As shown in FIG. 26, a micropattern measuring process according to this embodiment is the same as that in the aforementioned first embodiment up to step S5, but the process thereafter is different. Incidentally, it is assumed that such an image as shown in FIG. 27 can be acquired. Namely, as shown in FIG. 27, it is assumed that in the acquired image, a hole pattern 400 and part of a hole pattern 410 on a layer lower than the hole pattern 400 are seen. As described above, as a characteristic of the SEM image, a portion corresponding to an edge 420 of the hole pattern 400 and a portion corresponding to an edge 430 of the lower-layer hole pattern 410 shine brighter and more whitely than the other portions. In the related measuring method, the upper-layer hole pattern 400 cannot be successfully measured due to the portion corresponding to the edge 430 of the lower-layer hole pattern 410.

Figure 28:
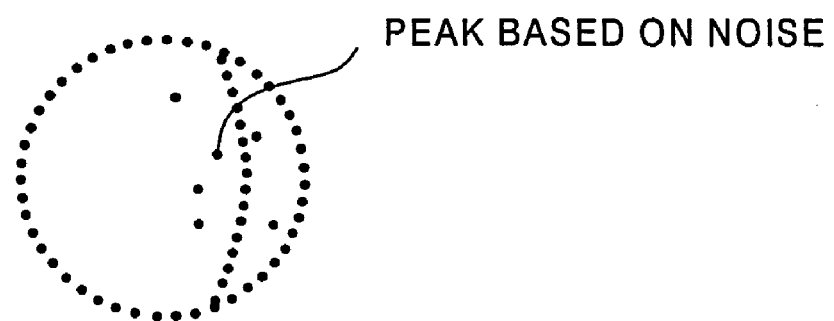
FIG. 28 is a diagram showing a sequence of peak points in a case where noise occurs when peak points are extracted from the image in FIG. 27.

It is assumed that a sequence of peak points acquired from the SEM image in FIG. 27 in step S5 is as shown in FIG. 28. As shown in FIG. 28, in addition to peak points of the upper-layer and lower-layer hole patterns 400 and 410, many peak points based on noise are seen. In such a case, grouping and evaluation of connectivity cannot be sometimes performed successfully by the methods in the first and second embodiments. Moreover, the peak points based on noise are located at random, whereby it is difficult to eliminate the peak points even by the method using Hough transformation such as in the third embodiment.

Figure 29:
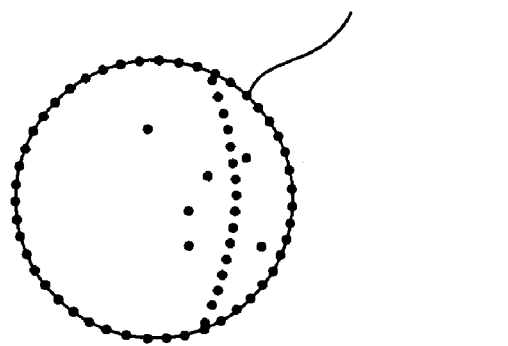
FIG. 29 is a diagram showing an example of a calculation result when a convex hull is calculated with respect to the peak points in FIG. 28.

Hence, the micropattern measuring apparatus 100 according to this embodiment calculates, with respect to a set of peak points forming this sequence of peak points, a convex hull containing all of these peak points (step S60). This calculation of the convex hull can be performed by Graham's algorithm, Jarvis's algorithm, or the like. As a result of calculating the convex hull with respect to the sequence of peak points shown in FIG. 28, a circular convex hull 440 such as shown in FIG. 29 is obtained.

The target pattern is on the uppermost layer and thereby should be situated furthest outside, whereby it can be said that the peak points contained in the convex full are composed of peak points of the target pattern. Accordingly, on the basis of the peak points contained in the convex full, the edge is extracted (step S9) and the pattern is measured (step S10) in the same manner as in the first embodiment.

Figure 30:
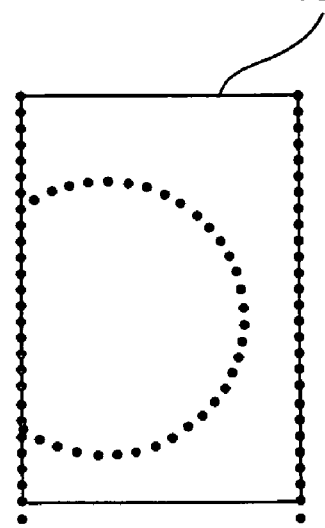
FIG. 30 is a diagram showing an example of a calculation result when a convex hull is calculated with respect to the peak points in FIG. 23.

It should be mentioned that this embodiment can be also applied to a case where a space pattern is measured as in the aforementioned third embodiment. FIG. 30 is a diagram showing a convex hull 450 corresponding to the sequences of peak points in FIG. 23. In this case, edge extraction and measurement have only to be performed on the basis of peak points contained in the convex hull 450.

As described above, also according to the micropattern measuring apparatus 100 of this embodiment, it is possible to measure a target pattern stably and accurately even when patterns formed on different layers appear in one image. More specifically, a convex full is calculated from peak points obtained from an acquired image. The calculated convex hull is a pattern situated furthest outside, and hence can be judged as the target pattern. Namely, the pattern specified by the convex hull can be judged to be a pattern belonging to the uppermost layer.

It should be mentioned that the present invention is not limited to the aforementioned embodiments, and various changes may be made therein. For example, the measuring methods shown in the aforementioned first to fourth embodiments may be performed separately or in combination. For example, after the evaluation of connectivity between peak points by the method in the second embodiment, the evaluation of a portion forming a closed path may be performed by using a Fourier descriptor as in the first embodiment. Alternatively, after the evaluation of connectivity between peak points by the method in the second embodiment, pattern kinds and respective groups may be associated with each other by referring to an association table with the pattern kinds as in the second embodiment. Moreover, after the evaluation of connectivity between peak points by the method in the second embodiment, it may be judged whether straight line components exist by performing Hough transformation as in the third embodiment.

Further, the SEM is used as means for acquiring an image in each of the aforementioned embodiments, but any other apparatus such as an optical microscope capable of acquiring an image in which two or more layers are seen at the same time may be used.

Furthermore, in each of the aforementioned embodiments, the peak positions of the gray-scale profile are used in order to obtain rough information on the outline of a pattern, but some other information may be used.

Figure 31:
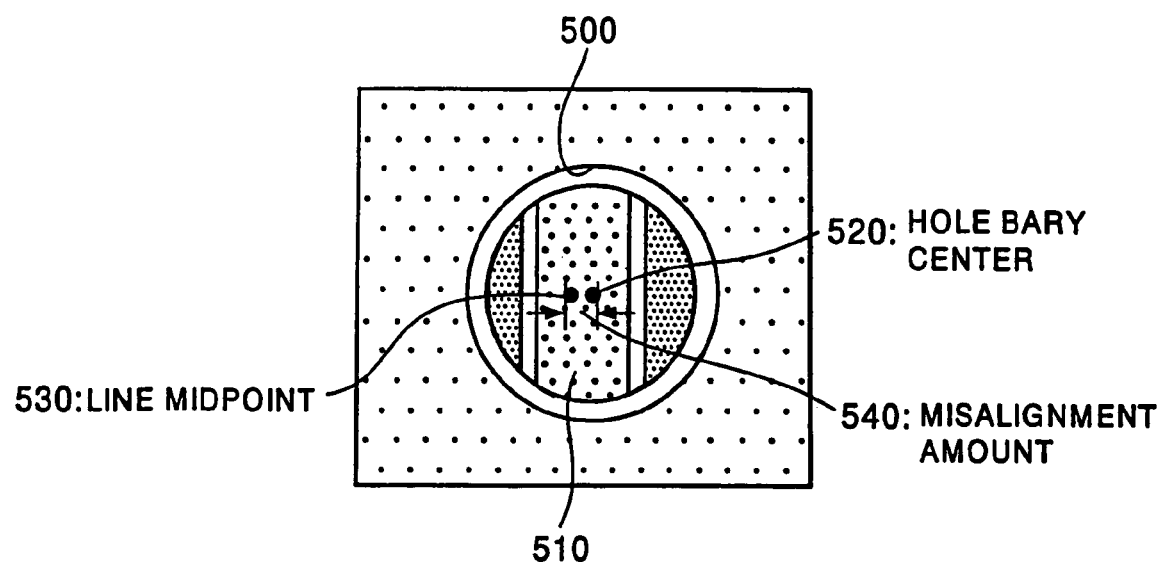
FIG. 31 is a diagram showing an example in which misalignment is calculated from an acquired image.
Figure 32:
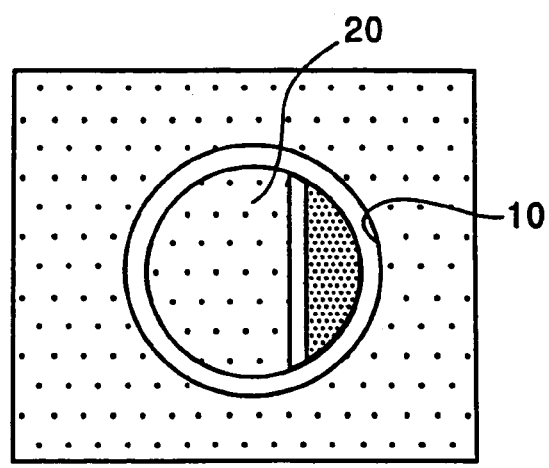
FIG. 32 is a diagram showing an example of an acquired image when a hole pattern is on an upper layer and a line pattern is on a lower layer.
Figure 33:
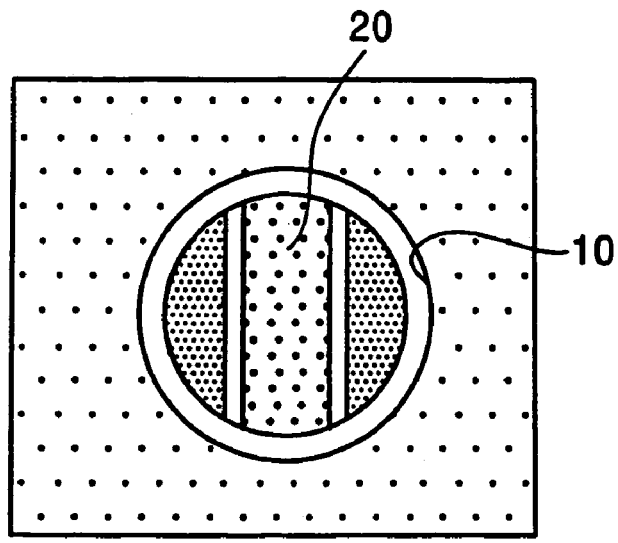
FIG. 33 is a diagram showing another example of the acquired image when the hole pattern is on the upper layer and the line pattern is on the lower layer.
Figure 34:
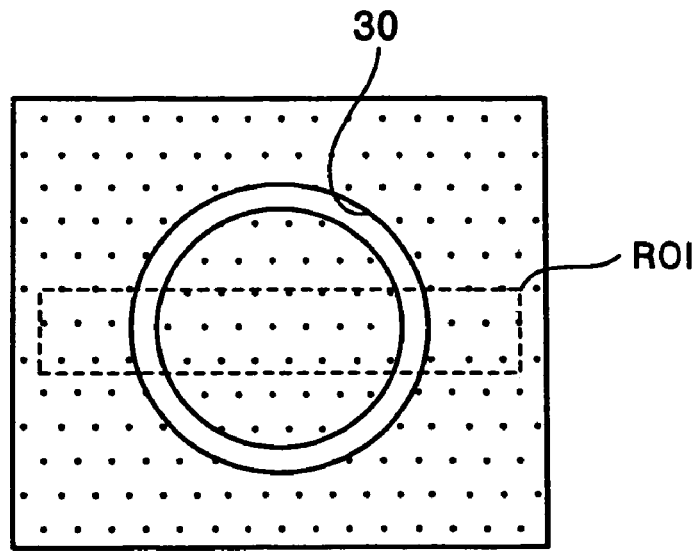
FIG. 34 is a diagram showing an example of an ROI set in a contact hole.

In addition, by using any of the methods in the aforementioned first to fourth embodiments, a misalignment between two layers can be measured. For example, as shown in FIG. 31, when a lower-layer line pattern 510 is seen inside a hole pattern 500, by making a sequence of peak points belong to the hole pattern 500 or the line pattern 510 and extracting edges of the respective patterns by any of the methods in the aforementioned embodiments, a centroid 520 of the hole pattern 500 and a midpoint 530 of the line pattern 510 can be calculated. By calculating the amount of misalignment between the position of the centroid 520 and the position of the midpoint 530, a misalignment amount 540 in the horizontal direction can be calculated. Further, it is also possible to extract a common region between two layers and measure an overlap area.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the micropattern measuring apparatus 100 being a computer read the record medium on which this program is recorded and execute this program.

The micropattern measuring apparatus 100 sometimes has other programs such as an operating system, other application programs, and the like. In this case, in order to use these other programs in the micropattern measuring apparatus 100, a command, which calls a program to realize a process equal to that in the aforesaid embodiments out of programs in the micropattern measuring apparatus 100, may be recorded on the record medium.

Further, such a program can be distributed not in the form of the record medium but in the form of a carrier wave via a network. The program transmitted in the form of the carrier wave over the network is incorporated in the micropattern measuring apparatus 100, and the aforementioned embodiments can be realized by executing this program.

Furthermore, when being recorded on the record medium or transmitted as the carrier wave over the network, the program is sometimes encrypted or compressed. In this case, the micropattern measuring apparatus 100 which has read the program from the record medium or the carrier wave needs to execute the program after decrypting or expanding it.

What is claimed is:

1. A computer-readable recording medium comprising a micropattern measuring program, which is recorded on the medium, the micropattern measuring program comprising:

computer readable program code which acquires an image of a micropattern including plural layers;

computer readable program code which extracts a rough outline of the micropattern in the image as a sequence of points including plural points;

computer readable program code which divides the plural points composing the sequence of points into groups;

computer readable program code which makes each of the groups as each of patterns belong to any of the plural layers; and computer readable program code which acquires edge coordinates of a pattern to be measured from the patterns which are made to belong to the respective layers;

wherein the computer readable program code which divides the plural points into groups comprises:

computer readable program code which searches for points composing the rough outline in each of search directions with a representative point as a center and counts a distance from the representative point to each of detected points and the number of detected points in each of the search directions, computer readable program code which ranks sequences of points, based on the distance from the representative point to each of the points in respective searches, computer readable program code which divides the respective sequences of points as subgroups based on the number of detected points and the ranking in the respective searches, and computer readable program code which connects the subgroups to constitute one group when a distance between end points of the respective subgroups is a threshold value or less.

2. The computer-readable recording medium according to claim 1, further comprising:

computer readable program code which judges, according to a distance between sequences of points composing the rough outline, whether the sequences of points connect with each other, and creates a tree to show connectivity, before the dividing the plural points into groups.

3. The computer-readable recording medium according to claim 1, wherein in the computer readable program code which makes each of the groups belong to any of the plural layers, when plural sequences of points composing closed paths exist, it is judged that a sequence of points of a closed path which is situated furthest outside is the pattern to be measured.

4. The computer-readable recording medium according to claim 1, wherein in the computer readable program code which makes each of the groups belong to any of the plural layers, when plural sequences of points composing closed paths exist, Fourier descriptors for the respective closed paths are calculated, and the pattern to be measured is specified based on the calculated Fourier descriptors.

5. The computer-readable recording medium according to claim 1, wherein in the computer readable program code which makes each of the groups belong to any of the plural layers, an association table in which each combination of patterns and connectivity of the sequence of peak points composing the rough outline are associated with each other is previously stored, and each pattern including a sequence of points is made to belong to any of the layers by checking the connectivity of the acquired sequence of points composing the rough outline based on the association table.

6. The computer-readable recording medium according to claim 1, wherein in the computer readable program code which makes each of the groups belong to any of the plural layers, the pattern to be measured is extracted by classifying the sequence of points composing the rough outline into a straight line and the others by using a Hough transformation.

7. The computer-readable recording medium according to claim 1, wherein in the computer readable program code which makes each of the groups belong to any of the plural layers, with respect to the sequence of points composing the rough outline, a convex hull containing all points of the sequence of points is calculated, and a sequence of points composing the convex hull is judged to be the pattern to be measured.

8. The computer-readable recording medium according to claim 1, wherein centroid positions of patterns of the respective layers are calculated based on the edge coordinates acquired in the computer readable program code which acquires the edge coordinates, and misalignment between an upper layer and a lower layer is measured.

* * * * *